United States Patent Office 3,776,817
Patented Dec. 4, 1973

3,776,817
METHOD AND APPARATUS FOR DETERMINING BACTERIAL GROWTH
Hans J. von der Pfordten, 3463 Ashton Court, Palo Alto, Calif. 94306
Filed Oct. 4, 1971, Ser. No. 186,365
Int. Cl. C12k 1/04
U.S. Cl. 195—103.5 R
21 Claims

ABSTRACT OF THE DISCLOSURE

Apparatus and a method for use in determining the growth of bacteria in the presence of an inhibiting agent, such as an antibiotic. The apparatus includes a disk of transparent material mounted for rotation and having a number of outer peripheral cavities for receiving the bacteria in solutions containing the growth inhibiting agents of either the same or different types. The disk can possibly have a central cavity for receiving a mass of bacteria in a solution free of an inhibiting agent. A pair of photocells adjacent to the central cavity and a position to be occupied by one of the peripheral cavities sense the radiation scattered along paths extending 90° to the radiation passing into the the disk and the solutions from a radiation source near the outer periphery of the disk. The signals generated by the photocells at the beginning and end of a predetermined time interval are processed so that curves of the logarithm of the bacteria growth versus time can be obtained to permit the use of extrapolation techniques for determining zero growth of the bacteria.

---

This invention relates to improvements in the technique of measuring the inhibition of bacterial growth and, more particularly, to apparatus and a method of monitoring bacterial growth to accelerate determination of sensitivity of the bacteria to different kinds and concentrations of inhibiting agents.

The growth of bacteria in a nutritive medium can be shown to follow a logarithmic curve to a stationary phase of growth. Two time-spaced samplings taken during the growth period of the bacteria can establish a growth time constant of a specific bacteria for each antibiotic tested in a specified dilution. This information can be processed by analog or digital circuitry with the known concentration of the antibiotic so as to define the most effective antibiotic and the required optimum concentration thereof to stop bacteria growth completely.

In the past, it has been necessary to utilize measurements using the turbidity (tube dilution) method or the Kirby-Bauer (disk diffusion) method which generally required 24 hours to obtain a correlation of bacteria growth in the presence of antibiotics.

The present invention provides an improvement over conventional methods by use of a technique which significantly minimizes the time required to make the necessary determinations of bacteria growth. This is achieved by the use of a strobing method wherein samples are taken after growth of bacteria has commenced in the presence of an antibiotic and then, in a relatively short time thereafter, such as within four to five hours, samples are again taken to obtain a second determination of the bacteria growth. Thus, it is possible, within such relatively short time, to obtain two points which can be utilized to determine the slope of a curve of logarithm of bacteria growth versus time. With several plots obtained in this manner for a given type of bacteria and for different types and concentrations of antibiotics, it is possible to extrapolate so that the type and concentration of antibiotic to inhibit completely the bacteria growth can be determined.

The foregoing is achieved in the present invention by noting minute changes in the optical properties of the solutions containing the bacteria and the antibiotics. Radiation scattered by bacteria suspended in the solutions at 90° angles to the incident radiation is sensed to provide indications of bacteria growth at the beginning and end of the relatively short time interval. In such case, good resolution is obtained even in low intensity ranges. The sensed indications are converted into electronic signals which are stored and processed eventually to obtain the various points on a family of curves representing the bacteria growth patterns for the various types and/or concentrations of antibiotics. With this family of curves, it is then possible to extrapolate in the manner described above.

The apparatus for carrying out the method of the present invention includes a rotatable disk having a central reference cavity in which a bacteria-containing solution free of antibiotics is directed, and a number of outer peripheral sampling cavities which have respective solutions containing the bacteria and antibiotics of different types and/or concentrations. A pair of photocells are arranged to sense only light scattered at 90° to the incident light from the central cavity and from one of the sampling cavities. Signals generated by the photocell of the central cavity can be used without reference to the signals generated by the other photocell to obtain a plot of the uninhibited bacteria growth versus time, if desired. Likewise, the signals generated by the photocell of the outer peripheral cavities may be processed by themselves without reference to the one generated by the photocell of the central cavity, yielding absolute readings.

Generally, the signals from the two photocells will be compared to obtain differential signals corresponding to each sampling cavity at the beginning and end of the time interval, so that such differential signals can be used to obtain the necessary family of curves. Of course, it is possible, and under some circumstances desirable, to compare absolute readings instead of differential readings at two different times.

After the signal from each sampling cavity has been obtained, the disk is rotated to move the next sampling cavity into position adjacent to the sampling photocell. Each cavity has provided in it a means for stirring the same so as to agitate the solution therein. A bubble of air in each cavity serves to effect such agitation since the bubble of air will move about due to rotation of the disk itself.

The radiation for use with the present method may include visible light (white or monochromatic), coherent radiation, polarized light, and constant intensity or pulse light. Also, fluorescence and halographic or spectroscopic techniques can be used as well.

The primary object of this invention is to provide an improved apparatus and method for determining bacteria growth in the presence of an inhibiting agent wherein minute changes occurring during a relatively short time interval in the optical properties of a bacteria-containing solution can be utilized as a measure of the bacteria growth so as to minimize the time for determination of such growth and thereby establish the type and concentration of antibiotic suitable to assure zero bacteria growth.

Another object of this invention is to provide apparatus and a method of the type described wherein the growth of bacteria in cavities provided therefor can be determined as a function of the radiation scattered by bacteria-containing solutions along a path at an angle to the radiation directed into the cavities at different times so as to obtain data suitable for use in calculating data representing bacteria growth versus time and thereby permit subsequent extrapolation to obtain the information assuring zero bacteria growth.

Other objects of this invention will become apparent as the following specification progresses, reference being had to the accompanying drawing for an illustration of the apparatus of the invention.

The apparatus for carrying out the teachings of the present invention includes a disk 12 formed of a material permitting light to be transmitted therethrough. The disk can be of plexiglass or other highly transparent, optically dense material. It is preferably about 4 to 10 millimeters thick and has a central reference cavity 14 and a plurality of circumferentially spaced, outer peripheral sampling cavities 16 symmetrically located with respect to central cavity 14 in the manner shown in FIG. 3. Cavity 14 has an annular outer recess 20 in fluid communication therewith and extending partially into one face of the disk. The purpose of recess 20 is to receive an air bubble when cavity 14 is filled with a solution, the air bubble being used to agitate the suspension as the disk is rotated.

Figure 3:
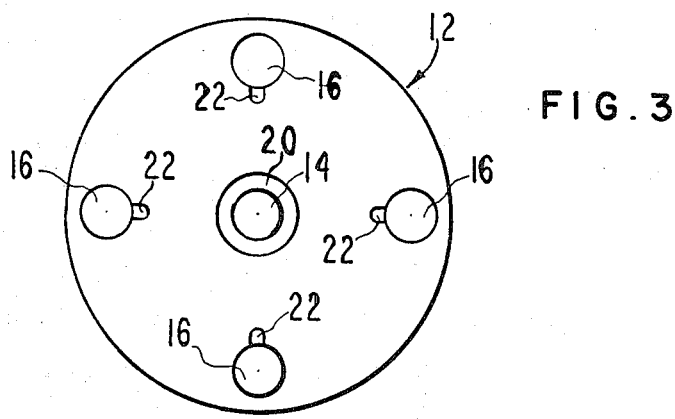
FIG. 3 is a side elevational view of the disk of FIG. 1.

Each of the cavities 16 has an outer recess 22 in fluid communication therewith and extending towards central cavity 14 as shown in FIG. 3. Each recess is provided to receive an air bubble for the same purpose mentioned above. Each recess 22 is located so that, when the corresponding cavity 16 is in the lowermost position with respect to central cavity 14, the recess will be above the cavity 16 and in a position to provide storage for the air bubble so that the bubble will not interfere with the maximum utilization of the cavity volume for light scattering by the bacteria; thus, the bubble will not interfere with radiation scattered by the solution in the cavity.

Cavities 14 and 16 are adapted to receive a quantity of a nutrient and a mass of bacteria in a solution. The cavities 16 are also adapted to receive different types and/or concentrations of a growth inhibiting agent, such as an antibiotic; whereas, central cavity 14 has an antibiotic. Thus, the growth of the bacteria in central cavity 14 will be uninhibited; whereas, the growth of the bacteria in each cavity 16 may or may not be inhibited depending upon the type and/or concentration of the antibiotic therein.

To fill the cavities, the disk is first provided with a layer 24 of a suitable material, such as a thin sheet of light-transparent plastic which seals one end of each cavity. The disk is then placed in a flat condition with layer 24 on the bottom thereof. Then the cavities are filled with the desired solutions, following which a second layer 26 of the same material as layer 24 is placed over the opposite ends of the cavities to seal the fluids therewithin.

The disk is then mounted by mounting means 13 in a vertical position for rotation about the horizontally disposed central axis of the disk. A drive motor 28 is coupled with the disk for rotating the same about its central axis. The dashed line 30 indicates the connection between the motor and the disk.

A first photocell 32 is placed in horizontal alignment with central cavity 14 and a second photocell 34 is placed in horizontal alignment with the position of a cavity 16 in the lowermost cavity position of disk 12, i.e., in vertical alignment with central cavity 14. Photocells 32 and 34 are coupled to a logarithmic amplifier 36 which receives and compares signals from the photocells and provides a differential signal output coupled to a sampling memory 38 which, in turn, is coupled to a calculator or computer 40. A print-out device 42 coupled with the calculator is operable to read out the results of a calculation made with data from memory 38. An elapsed time indicator 44 is also coupled with calculator 40 as is an address memory 46 and a sample designation indicator 48. Memory 46 is also coupled with motor 28 so that the latter will be stepped sufficiently to advance a second cavity 16 to the lowermost disk position after a sample has been taken with a first cavity 16.

Figure 1:
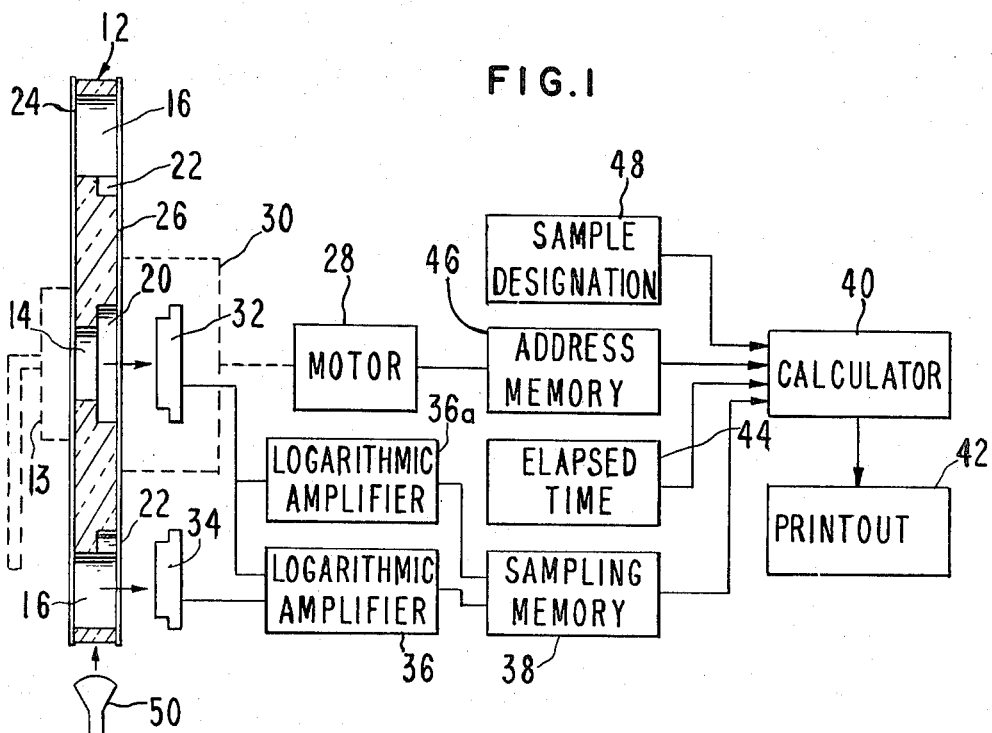
FIG. 1 is a schematic view of the apparatus for carrying out the teachings of the present invention, showing the rotating disk in cross section.
Figure 2:
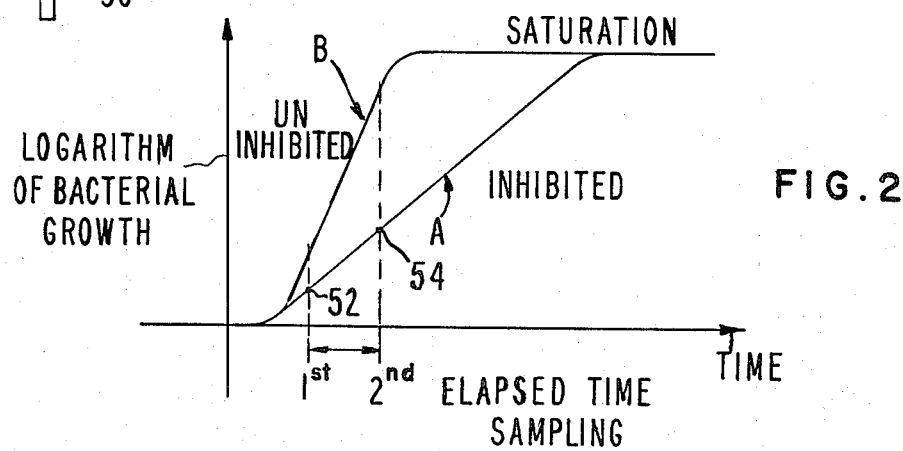
FIG. 2 is a graphical view of the information which is obtained when the results of the method of the invention are utilized.

The photocells 32 and 34 are disposed to receive radiation scattered by the solutions in cavity 14 and the lowermost cavity 16. A radiation source 50 such as a source of visible light, is disposed adjacent to the outer periphery of disk 12 below the lowermost cavity position as shown in FIG. 1. The radiation from source 50 enters the disk since the latter is transparent to light and such radiation is scattered by the bacteria in the lowermost cavity 16. The radiation scattered along an angular path of 90° is sensed by photocell 34. The incident radiation also travels into and through the disk portion between cavities 14 and 16, and into the cavity 14 from which it is also scattered by the solution therein, the radiation scattered along a path 90° to the incident light in cavity 14 being sensed by photocell 32.

In operation, the cavities of disk 12 are initially filled with the desired solutions and are then sealed. The disk is then mounted in its vertical, operative position for rotation about its central axis and is coupled with motor 28. Photocells 32 and 34 are put into place and motor 28 is energized to rotate the disk until one of the cavities 16 becomes aligned with photocell 34, i.e., moves into the lowermost disk position of FIG. 1. As the disk rotates, the air bubbles in the various cavities agitate respective solutions to promote the metabolism of the bacteria therein. When a cavity 16 reaches the lowermost disk position, motor 28 is stopped and a sample is taken by directing radiation from source 50 into the disk through the outer periphery thereof below the lowermost cavity 16. Radiation scattered along respective paths 90° to the incident radiation is sensed by both photocells 32 and 34 and the signals from the photocells are directed to amplifier 36 at which they are compared to obtain a differential signal which is amplified and then stored as data in sampling memory 38. The stored signal will represent an initial growth stage of the bacteria in cavity 16 corresponding to the beginning of a predetermined time interval.

Disk 12 is then rotated until the next cavity 16 is in the lowermost disk position aligned with photocell 34. Then, radiation from source 50 again is directed into the disk and the radiation will be scattered by the solutions in the corresponding cavity 16 and central cavity 14. The photocells 32 and 34 will sense the scattered radiation directed along respective paths 90° to the incident radiation and the signals from the photocells will again be directed to amplifier 36 where they will be compared to obtain another differential signal corresponding to the beginning of the aforesaid time interval. This differential signal will also be stored. The foregoing steps will be repeated until all cavities 16 will have been so sampled.

The disk is then removed from mounting means 13 and placed in an incubator (not shown) for an incubation period corresponding in length to the aforesaid time interval. After the incubation period, which, for purposes of illustration, is four to five hours, the disk is then returned to its operative position of FIG. 1 and the foregoing sampling steps are again performed with respect to each cavity 16. The differential signals so obtained will be stored as data in memory 38 as before.

Next, the data from memory 38 is directed into calculator 40 which will calculate values of the logarithm of the bacterial growth at the beginning and at the end of the aforesaid time interval. These values are then plotted versus time for the solution in each cavity 16 to obtain a family of curves, each of which will have a slope different from those of the other curves. The plot corresponding to one of the cavities 16 results, for instance, in curve A and only two points on the curve are needed since the curve will be linear throughout the major portion of its length. These points are denoted by the numerals 52 and 54 on curve A.

To obtain a similar curve in the uninhibited condition of the bacteria, the signal generated by photocell 32 is directed to another logarithmic amplifier 36a similar in function to amplifier 36 and also connected with memory 38. Curve B can be obtained from data directed to the calculator from memory 38 after having been received from amplifier 36a. It will be clear that such data will show a trend in which the bacteria will be more or less inhibited depending upon the type and/or concentration of the antibiotic in cavities 16. The trend established by a family of curves can be extrapolated back to zero to obtain the requisite concentration of antibiotics to assure zero bacterial growth. Moreover, the method of the invention will provide a determination of which antibiotics are capable of any inhibiting effects on the bacteria and which antibiotics are not capable of such inhibiting effects.

Curves A and B are obtained from the following expression:

$$B = b \times 2^n$$

where B is the number of bacteria at the end of a given time interval and $b$ is the number of bacteria at the beginning of a given time interval and $n$ is the number of generations of bacteria reproduced by partitioning.

Taking the logarithm of both sides, the following expression is obtained:

$$\text{Log } B = \log b + n \log 2$$

solving for $n$, we have: $n = 3.3 \log B/b$

The time for one generation of bacteria is given as:

$$G = t/n = t/3.3 \log B/b$$

where $t$ is the independent variable, namely, time. Using the last expression, curves A and B can be plotted.

In order to collect all scattered light in carrying out the method of this invention, a mirror may be mounted to the left of the lowermost outer peripheral cavity 16 when viewing FIG. 1, such that light scattered toward the mirror would be reflected through the cavity and to photocell 34.

The teachings of the invention can be used to measure radiation scattered by solutions other than solutions containing bacteria and growth inhibiting agents as described above. For instance, disk 12 can be provided with chemical, fluorescent or biological (coagulant) solutions in the outer peripheral cavities 16 thereof and again the scattered light could be sensed by a photocell or by a spectrophotometer. In this way, certain characteristics of the solutions, referenced to a standard by a previous measurement, can be calculated. For instance, the pH of different solutions can be readily determined in this manner.

The teachings of the present invention can generally be used in pollution control, i.e., in measuring the effect of agents inhibiting or promoting the growth of harmful bacteria (open, e.g., in treatment of sewage) or algae.

In the claims:

1. Apparatus for determining bacteria growth in the presence of a growth inhibiting agent comprising: a source of radiation; a disk having an outer peripheral face and a pair of spaced fluid-receiving cavities spaced inwardly from said face, said disk being transparent to the radiation from said source, each cavity adapted to contain a solution containing a mass of bacteria capable of growth, with the solution in only one of the cavities having a growth inhibiting agent therein; means mounting said disk and said source for movement relative to each other with said source being disposed adjacent to said face to direct light along a first path into the disk through said face and toward and into one of said pair of cavities, whereby a portion of the light can be scattered by the solution therein along a respective second path disposed at an angle to said first path; means adjacent to said disk for sensing the radiation scattered along each second path and for providing an indication of the amount of radiation sensed thereby; and circuitry means coupled with the sensing means of each cavity for processing the indications generated thereby.

2. Apparatus as set forth in claim 1, wherein said one cavity is adjacent to the outer periphery of the disk and the other cavity is at the center of the disk, said radiation source being a source of visible light.

3. Apparatus as set forth in claim 2, wherein is provided means mounting the disk for rotation about a horizontal axis and means coupled with the disk for rotating the same about said axis.

4. Apparatus as set forth in claim 1, wherein the sensing means for each cavity comprises a photocell, said circuitry means including a logarithmic amplifier coupled with the photocells for receiving signals therefrom, said amplifier having a signal output providing a differential signal which is a function of the input signals thereto, a memory for storing the data represented by a number of differential signals, calculator means coupled with the memory for receiving data therefrom and for calculating preselected parameters based upon said data; and print-out means coupled with the calculator means for printing out the calculations thereof.

5. Apparatus as set forth in claim 1, wherein each cavity has an opening for receiving the corresponding solution, and means engageable with the member for sealing the opening of each cavity.

6. Apparatus for sampling bacteria growth in the presence of an antibiotic comprising: a disk of transparent material having an outer peripheral face, a central cavity, and a plurality of outer peripheral circumferentially spaced cavities, each outer peripheral cavity adapted to contain a solution having a mass of bacteria and a growth inhibiting antibiotic therein, the central cavity adapted to contain a solution having a mass of said bacteria therein and being free of said antibiotic; means engageable with the disk for sealing the cavities thereof, whereby fluid in the cavities will be retained therein; means mounting the member in a generally vertical plane for rotating about its central axis; means coupled with the disk for rotating the same about said axis; a first photocell horizontally aligned with the central cavity of the disk; a second photocell horizontally aligned with a position into which an outer peripheral cavity can be moved as the disk is rotated; a source of radiation adjacent to the outer peripheral face of the disk, said source being adapted to direct radiation into the disk through the outer peripheral cavity at said position and into the central cavity, whereby a portion of the radiation from said beam can be scattered at 90° to the direction of the beam from said source and will be sensed by said first and second photocells; and circuitry means coupled with said photocells for processing the signals generated thereby.

7. Apparatus as set forth in claim 6, wherein each cavity extends through the disk between the opposed faces thereof, the central cavity having an annular recess in fluid communication with the central cavity and surrounding the same, each outer peripheral cavity having a recess in fluid communication therewith and extending partially toward the central cavity, said sealing means including a thin sheet of transparent material for each face of the disk, respectively, each sheet being disposed to cover the adjacent end of each cavity of the disk.

8. A method of determining bacteria growth comprising: providing a transparent disk having an outer peripheral face and a cavity spaced inwardly from the face and containing a solution having a mass of bacteria therein; at the beginning of a predetermined time interval, directing radiation along a first path into said disk through said face and into the cavity, whereby a portion of the radiation will be scattered by the contents of the cavity along a second path disposed at an angle to the first path; sensing the radiation scattered along the second path; storing an indication of the sensed radiation; at the end of said predetermined time interval, repeating the directing and sensing steps to obtain another indication of the sensed radiation and comparing the indications of the sensed radiation to obtain an indication of the growth of the bacteria during said time interval.

9. A method as set forth in claim 8, wherein said sensing step includes generating an electronic signal in response to the amount of radiation scattered along said second path, and utilizing the signals corresponding to the beginning and end of said time interval to perform a calculation of the logarithmic growth of bacteria versus the length of the time interval.

10. A method as set forth in claim 9, wherein is included the step of obtaining a signal defining the logarithm of the value represented by the signal corresponding to the beginning of said time interval, said storing step including storing the data represented by said logarithm defining signal.

11. A method as set forth in claim 8, wherein the second path is at an angle of 90° to the first path.

12. A method for determining bacteria growth in the presence of an antibiotic comprising: providing a first cavity containing a solution having a mass of bacteria therein and being free of a growth inhibiting agent; providing a second cavity containing a solution having a mass of bacteria and a growth inhibiting agent therein; at the beginning of a predetermined time interval, directing radiation into and through the cavities, whereby a portion of the radiation will be scattered by the solution in each cavity; sensing the radiation scattered from each cavity; comparing an indication of the radiation scattered from the first cavity with an indication of the radiation scattered from the second cavity to obtain a first differential signal representing the comparison at the beginning of said time interval; storing said differential signal; at the end of the predetermined time interval, repeating the directing, sensing and comparing steps to obtain a second differential signal representing the comparison of corresponding sensed radiation indications at the end of said time interval; and utilizing said first and second differential signals to obtain a determination of the growth of the bacteria in the presence of said agent during said time interval.

13. A method as set forth in claim 12, wherein is included the step of agitating the solution in each cavity during said time interval.

14. A method as set forth in claim 12, wherein said utilizing step includes directing the differential signals to a calculator, and calculating the values of logarithm of the bacteria growth for the beginning and the end of the time interval, whereby said values can be plotted to obtain the slope of the curve representing bacteria growth during said time interval.

15. A method as set forth in claim 12, wherein each cavity has an air bubble therein, and including the step of rotating the disk to rotate the second cavity about an axis through the first cavity to cause the air bubbles in the cavities to agitate the solutions thereof.

16. A method as set forth in claim 12, wherein the disk has a third cavity containing a solution having a mass of bacteria and a growth inhibiting agent therein with the agent in the third cavity being different from that of the agent in the second cavity; sensing the scattered radiation from the first and third cavities at the beginning of said time interval; comparing an indication of the radiation scattered from the first cavity to an indication of the radiation scattered from said third cavity to obtain a third differential signal representing the comparison at the beginning of said time interval, storing said third differential signal, repeating the last-mentioned directing, sensing and comparing steps at the end of said time interval to obtain a fourth differential signal representing the comparison of corresponding sensed radiations indications, and utilizing the third and fourth differential signals to obtain a determination of the growth of the bacteria in the presence of the agent in said third cavity during said time interval.

17. A method for determining bacteria growth in the presence of an antibiotic comprising: providing a reference cavity and a number of sampling cavities; placing a reference solution containing a mass of bacteria free of an antibiotic in the reference cavity; placing a sampling solution in each sampling cavity with each sampling solution containing a mass of bacteria and an antibiotic with the antibiotic in each sampling cavity being at a concentration different from that of the antibiotics in the other sampling cavities; at the beginning of a predetermined time interval, directing light simultaneously into the reference cavity and into a first sampling cavity; sensing the light scattered by the solution of each of the last-mentioned cavities as the light travels along a path 90° to the path of the incident light; generating signals corresponding to the scattered light sensed from the central and sampling cavities; comparing said signal to obtain a differential signal corresponding to the beginning of said time interval; storing said differential signal; performing the directing, sensing, comparing and storing steps with respect to each of the other sampling cavities at the beginning of said time interval; at the end of said time interval, repeating the directing, sensing and comparing steps with respect to each of said sampling cavities; and processing the data represented by the differential signal obtained at the beginning and at the end of said time interval to obtain determinations of bacteria growth in the presence of different concentrations of antibiotics.

18. Apparatus for measuring a predetermined characteristic of a number of solutions comprising: a transparent disk having means thereon for mounting the same for rotation about an axis therethrough, there being a number of cavities in the disk and spaced outwardly from said axis, each cavity having a respective solution therein, each solution having a predetermined characteristic different from that of the solution in another cavity; a source of radiation adjacent to said disk and disposed to direct radiation into one of the cavities when the latter is in a predetermined position along its circular path of travel, whereby light entering the cavity along one direction will be scattered by the solution therein; a light sensor adjacent to said predetermined cavity position and disposed to sense the radiation scattered along a direction at an angle to said one direction; and circuitry means coupled with said sensor for receiving therefrom an indication of the radiation sensed thereby, whereby said indication can be used to determine said predetermined characteristic of the solution in the cavity disposed in said predetermined position.

19. Apparatus for determining bacteria growth in the presence of a growth inhibiting agent comprising: a source of radiation; a disk having an outer peripheral face and a pair of spaced fluid-receiving cavities spaced inwardly from said face, said disk being transparent to the radiation from said source, each cavity adapted to contain a solution containing a mass of bacteria capable of growth, with the solution of only one of the cavities having a growth inhibiting agent therein, each cavity having an outer peripheral recess for receiving an air bubble when the corresponding solution is disposed in the cavity; means mounting said disk for rotation about a predetermined axis relative to said source, said source being disposed adjacent to said face to direct light along a first path into the disk through said face and toward and into a cavity, whereby a portion of the light can be scattered by the solution therein along a respective second path disposed at an angle to said first path, the air bubble in each cavity being operable to agitate the fluid therein as the disk rotates; means adjacent to said disk for sensing the radiation scattered along each second path and for providing an indication of the amount of radiation sensed thereby;

and circuitry means coupled with the sensing means of each cavity for processing the indications generated thereby.

20. Apparatus for determining bacteria growth in the presence of a growth inhibiting agent comprising: a source of radiation; a disk having a central axis, an outer peripheral face, a central cavity and a number of outer peripheral cavities, said cavities being spaced inwardly from said source, each cavity adapted to contain a solution containing a mass of bacteria capable of growth, with the solution in only one of the cavities having a growth inhibiting agent therein; means mounting said disk in a vertical plane for rotation about said central axis relative to said source with said source being disposed adjacent to said face to direct light along a first path into the disk through said face and toward and into a cavity, whereby a portion of the light can be scattered by the solution in a cavity along a respective second path disposed at an angle to said first path; a first photocell horizontally aligned with the central cavity; a second photocell disposed at a location adjacent to the outer peripheral margin of the disk, the outer peripheral cavities being movable successively into and out of alignment with the second photocell as the disk rotates about said central axis, said photocells being operable to sense the radiation scattered along respective second paths and for providing indications of the amount of radiation sensed thereby; means coupled with said disk for rotating the same about said axis; and circuitry means coupled with the sensing means of each cavity for processing the indications generated thereby.

21. Apparatus as set forth in claim 20, wherein said radiation source is disposed below the disk in substantially vertical alignment with the central cavity thereof, said second photocell being in horizontal alignment with the position occupied by an outer peripheral cavity when the latter is in vertical alignment with said central cavity and said source.

References Cited
UNITED STATES PATENTS

| | | | |
|---|---|---|---|
| 3,542,515 | 11/1970 | Scott | 23—230 |
| 2,406,409 | 8/1946 | Sheridan | 356—103 |
| 3,322,956 | 5/1967 | Shah | 195—103.5 R |
| 3,172,235 | 3/1965 | Bjorklund | 195—142 |
| 3,490,875 | 1/1970 | Harmon et al. | 195—127 |

A. LOUIS MONACELL, Primary Examiner

R. J. WARDEN, Assistant Examiner

U.S. Cl. X.R.

23—230 B, 253 R; 195—127; 356—104